United States Patent [19]

Shekleton

[11] 4,182,280
[45] Jan. 8, 1980

[54] VORTEX AUTOMOTIVE COMBUSTION ENGINE

[76] Inventor: Jack R. Shekleton, San Diego, Calif.

[21] Appl. No.: 802,778

[22] Filed: Jun. 2, 1977

[51] Int. Cl.² .......................................... F02B 17/00
[52] U.S. Cl. ............................. 123/30 C; 123/32 ST;
123/32 SA; 123/191 R
[58] Field of Search ................ 123/30 C, 30 D, 32 B,
123/32 C, 32 D, 32 ST, 32 SP, 32 SA, 33 D, 75
B, 191 R, 191 S, 191 SP, 27 R, 28, 32 A, 30 R,
32 R, 33 R, 75 R, 79 R, 79 C

[56] References Cited

U.S. PATENT DOCUMENTS

| 1,414,384 | 5/1922 | Tartrais | 123/32 B |
|---|---|---|---|
| 1,566,128 | 12/1925 | Takata et al. | 123/191 R |
| 1,705,374 | 3/1929 | Ricardo | 123/32 D |
| 1,750,570 | 3/1930 | Chorlton | 123/30 D |
| 1,798,033 | 3/1931 | Rochefort | 123/32 C |
| 2,033,810 | 3/1936 | Bernard | 123/30 D |
| 3,092,089 | 6/1963 | Dolza | 123/75 B X |
| 3,408,992 | 11/1968 | Von Seggern et al. | 123/32 ST X |
| 3,443,552 | 5/1969 | Von Seggern et al. | 123/32 ST |
| 3,625,189 | 12/1971 | Myers | 123/32 ST |

FOREIGN PATENT DOCUMENTS 615324   1/1949   United Kingdom ................... 123/30 C Primary Examiner—Tony M. Argenbright
Attorney, Agent, or Firm—Brown & Martin

[57] ABSTRACT

A spark ignition internal combustion engine is provided with a symmetric open torus combustion chamber at the end of a cylinder with a coaxial inlet for intake of fuel air mixture into the chamber and a coaxial outlet communicating with the upper end of a dome shaped piston into the cylinder. Exhaust valves are symmetrically located within the engine and communicate with the cylinder below the combustion chamber. A spark plug is positioned to locate the spark chamber wall at the outermost diameter of the combustion chamber. The inlet is provided with a swirl inducing device to induce the fuel/air mixture to swirl around the circumference of the combustion chamber by centrifuge of liquid fuel droplets onto the walls thereof and thereby stratify the charge in the combustion chamber.

16 Claims, 4 Drawing Figures

VORTEX AUTOMOTIVE COMBUSTION ENGINE

BACKGROUND OF THE INVENTION

The present invention relates to internal combustion engines and pertains particularly to high compression, high air to fuel burning spark ignition engines.

Heretofore the fuel economy of automobiles has been very poor. This is primarily because of the lack of incentive to develop highly efficient engines because of the abundance of inexpensive fuel such as gasoline. The lack of control over emissions and emission standards has also contributed to the extensive use of inefficient automotive engines.

Recent emission regulations has also resulted in various modifications of automobile engines, which has resulted in a further decrease in fuel economy. These changes have also resulted in loss of power per size of engine, hotter running engines, and thus shorter life, higher fuel consumption, and the requirement for more expensive, higher octane fuels.

Many factors can affect fuel economy either directly or indirectly. Higher compression rations can increase fuel economy, but this is typically offset by mechanical losses and resultant losses from detonation for internal combustion engines. High compression ratios on the order of 12 to 1 for gasoline engines provide optimum fuel economy with the resultant problems, as pointed out above. Diesel engines, on the other hand, can run at higher compression ratios such as 22 to 1, at excellent efficiency and without detonation problems. However, such engines are heavy and extremely expensive for automotive use.

Higher air to fuel ratios can also increase fuel economy. However, current design of gasoline engines provide engines that cannot operate at air to fuel ratios much higher than 18. This is much less than is optimum for best fuel economy. Diesel engines can typically operate well at such high air/fuel ratios because of stratified charge fuel injection. However, the typical gasoline engine operates on a pre-mix of air and fuel, and cannot operate at such high air to fuel ratios.

In gasoline engines the flame of combustion is obtained by heating up the air fuel mixture by means of a spark until it ignites. The turbulence in the air fuel mixture spreads the flame throughout the combustion chamber. Flame propogates more rapidly throughout a low air to fuel ratio than in a high air to fuel ratio.

It has been found that at any air to fuel ratio the flame propagation rate varies directly as engine speed. In other words, if the engine speed is halved the flame propagation is halved also. This is believed to be as a result of the turbulent mass transfer within the cylinder which varies directly with speed. At higher air fuel ratios the flame is slower to propagate and the flame propagation rate varies directly with engine speed. Ignition is difficult at high air fuel ratios and the slow propagation of the flame raises fuel consumption.

In order to gain the fuel economy advantages of burning high air to fuel ratios, the mixture must be burnt much more quickly and at higher air to fuel ratios that is currently obtained. This is also necessary for low emissions and the use of more economic low octane fuels such as diesel oil or kerosene. Most of the combustion must occur immediately after top dead center encompassing a very few degrees of crank rotation. Current engine design is such that high air to fuel burning is so slow when it occurs, that it is still burning in the exhaust, causing overheating of the exhaust valves and the like and destructive to the life of the engine. This also creates detonation, pre-ignition, and wasting of fuel.

The running of an engine on a low air to fuel ratio can result in detonation or auto-ignition of a significant part of the air fuel mixture during propagation of the flame within the combustion chamber. Such detonation or auto-ignition will rapidly damage an engine. A number of things can be done to eliminate or reduce detonation or auto-ignition. For example, a conventional engine can be run at a higher speed with lower throttle to minimize the time needed to overheat and auto-ignite. This, of course, is contrary to the economic lower engine speed wider open throttle operation. The compression ratio can be lowered to reduce gas temperatures and the spark can be retarded, all of which are detrimental to gasoline economy. A high octane fuel can be used which gives a high auto-ignition delay time. These higher octane fuels are obtained at a price by use of lead additives, which becomes a pollutant and destroys exhaust catalyst. High octane unleaded fuels are of course much more expensive and are in short supply.

The typical gasoline engine in an automobile is highly throttled as ordinary operation demands only a small fraction of the maximum power available. This results in a lower air inlet manifold pressure and a much lower pressure than in the exhaust manifold. Such conditions result in exhaust products of the last combustion cycle becoming mixed with the air fuel charge. This dilution of the air fuel mixture results in problems of slow rates of propagation and creates problems of ignition and propagation of the higher air fuel ratios. This problem could be minimized by running the engine at a lower engine speed with a wider throttle opening but this is inhibited by detonation problems of current engines. By use of low air fuel mixture the problem can be minimized, which of course is contrary to good fuel economy. With a closed throttle, even at optimum air fuel ratios, the flame propagation is slow causing hot exhaust, poor economy, and for a vital period, these exhaust products being hot, well above 2000° F., puts heat into the cylinder walls causing difficulty in cooling and detonation and causes a short engine life.

Higher economy is obtained by fast burning of high air fuel ratios and by the use of higher compression ratios. An additional considerable gain could be obtained with the proper combustion chamber design and by the methods of driving.

It is desirable to have a light weight, low bulk, high power engine for automotive use. The light weight and low bulk results in greater gasoline economy, better styling and a more roomy auto with lower manufacturing costs. while the higher power engines is desired, by current consumers, the emission regulations have resulted in detuning of the engines so that they develop less power than former days while engine size and costs have increased.

Accordingly, it is desirable that an engine be available which overcomes the above problems of the prior art.

SUMMARY AND OBJECTS OF THE INVENTION

Accordingly, it is the primary object of the present invention to overcome the above problems of the prior art.

Another object of the present invention is to provide a novel stratified charge spark ignition engine.

Another object of the present invention is to provide an internal combustion engine of the spark ignition type having higher compression ratios than heretofore achieved.

A still further object of the present invention is to provide an internal combustion engine of the spark ignition type having greater fuel economies than has heretofore been achieved.

A still further object of the present invention is to provide a novel combustion chamber for a spark ignition, internal combustion engine that considerably improves the power and fuel economy of such engines.

A still further object is to provide an internal combustion engine of the spark ignition type with lower emissions than current engines.

A still further object is to provide an internal combustion engine of the spark ignition type that will operate on regular gasolenes and also on low octane fuels such as diesel oil and kerosene.

In accordance with the primary aspect of the present invention, an internal combustion engine of the spark ignition type is provided with a symmetrical combustion chamber having a generally open torus configuration coaxially disposed with respect to the cylinder and having axially arranged combustion charge inlet and an axially arranged combustion outlet into the cylinder.

BRIEF DESCRIPTION OF THE DRAWING

The above and other objects and advantages of the present invention will become apparent from the following description when read in conjunction with the drawings, wherein.

DETAILED DESCRIPTION OF A PREFERRED EMBODIMENT

Figure 1:
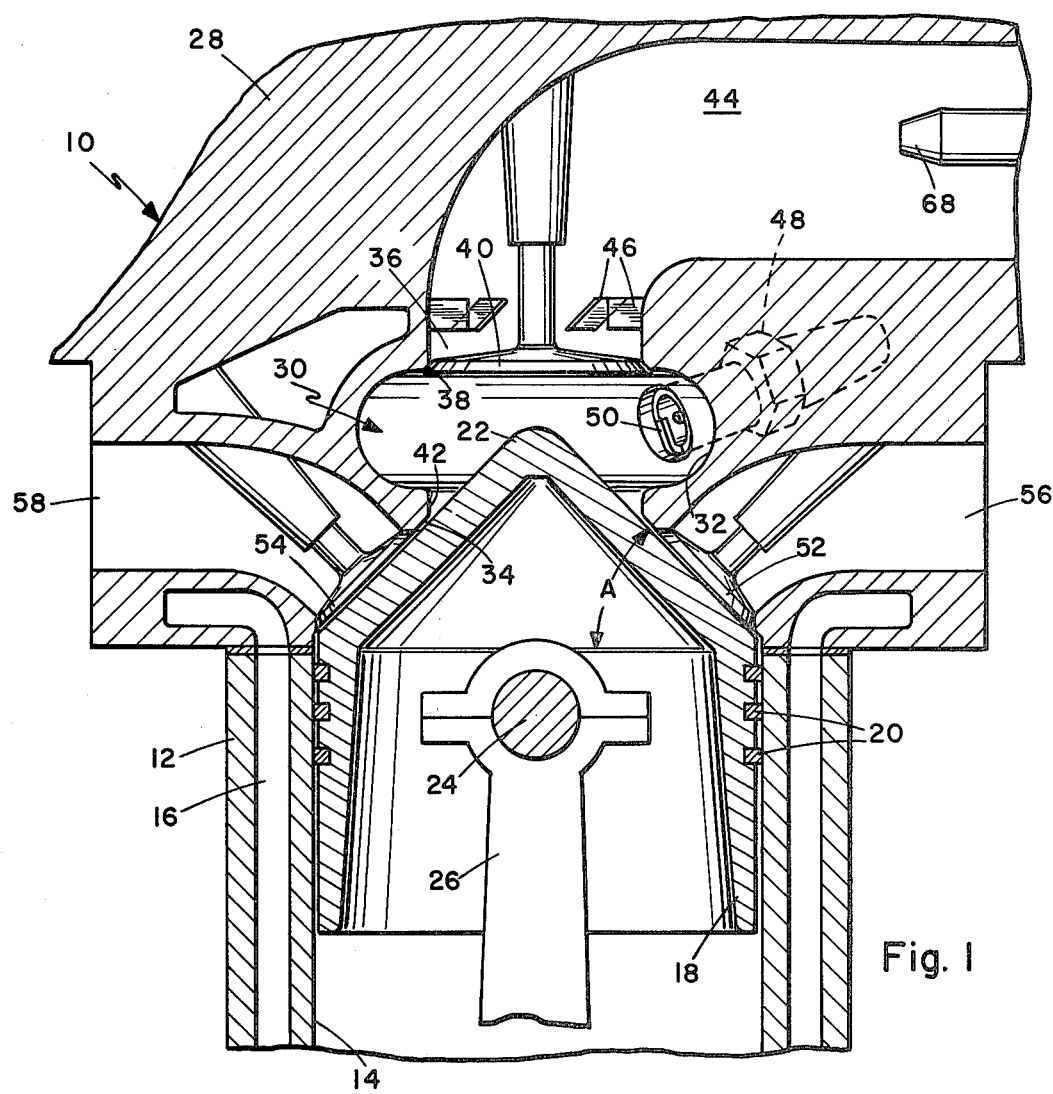
FIG. 1 is a vertical sectional view through a typical cylinder and head structure incorporating the novel piston and combustion chamber.

Turning now to the drawings, particularly to FIG. 1, there is illustrated a combustion chamber in accordance with the present invention for an internal combustion engine. Illustrated in FIG. 1 is a novel combustion chamber and piston combination designated generally by the numeral 10. The engine includes a cylinder block 12 having one or more cylinders defined by a cylindrical bore 14. A suitable water jacket or passage 16 is provided for circulating coolant through the cylinder block and head for cooling purposes. A piston 18 is reciprocally mounted within the bore 14 and includes the usual oil and compression rings 20. The piston of the present invention is preferably constructed to have a generally conical shaped dome head 22, the function of which will be more fully described later. The piston is mounted in the usual fashion by means of a wrist pin 24 to a connecting rod 26 which is journaled in the usual manner to a crank shaft (not shown).

The engine includes a cylinder head 28 with a combustion chamber, designated generally by the numeral 30, having a somewhat spherical shape hereinafter termed a generally open torus configuration as defined by a sigmoid of revolution being a quadratic surface whose sections by planes normal to the axis of revolution are more or less circular, while those sections by planes through the axis of revolution are sigmoidal. This combustion chamber 30 is disposed substantially coaxial of the cylinder 14. Some deviation in coaxial alignment may be permitted within the scope of the invention in order to achieve certain economies in construction, as will be described. The preferred embodiment, in any event, is essentially symmetrical about the axis thereof. The chamber 30 is defined by generally annular curved walls 32 disposed above the cylinder and about a generally frusto-conical portion 34 of the cylinder head. The combustion chamber 30 includes an inlet 36 preferably of a circular configuration communicating directly coaxially of the chamber itself. A valve seat 38 is formed at the juncture of the inlet passage 36 and the chamber 30 for receiving an intake valve 40. The intake valve 40 is likewise coaxial of the axis of the cylinder and combustion chamber. The center lines of these components all coincide as illustrated in the preferred embodiment. The combustion chamber 30 is also provided with an outlet 42 communicating with the cylinder 14.

The inlet 36 to the combustion chamber 30 communicates with an intake passage or manifold 44 for communicating air or a fuel air mixture into the combustion chamber. Suitable means for inducing swirl into the chamber 30 is provided, such as a plurality of vanes 46 which induce the inlet mixture to swirl within the chamber 30 for purposes as will be described. Alternate structures and/or techniques may be provided for swirling the air fuel mixture into and in the chamber 30.

Suitable ignition means, such as spark plug 48 is disposed in the cylinder head and having the points or ignition portion thereof 50 suitably disposed at the surface of the wall at about the outermost diameter of the combustion chamber 30 at the wall 32. This position, as will be discussed later, enhances the combustion process.

Suitable exhaust valves 52 and 54 are provided in the frusto-conical portion 34 of the cylinder head directly below the outlet 42 of chamber 30 and above the cylindrical portion of the cylinder 14. As is illustrated, the arrangement is preferably symmetrical with the pair of exhaust valves 52 and 54 disposed diametrically opposite one another within exhaust ports 56 and 58 respectively. This arrangement greatly enhances the efficiency of the scavenging or exhaustion of the combustion materials from the engine.

Again optimum efficiency is obtained by complete symmetry of the arrangement of the components about the center line, however, slight variations from symmetry may be desirable in order to obtain reduced cost and mechanical simplicity, such as to better locate and accomodate the water cooling passages, the spark plugs, the exhaust valves, etc. For example, a deviation in axial alignment between the cylinder and combustion chamber of about 12 degrees will permit a single exhaust valve to be positioned to one side of the cylinder head. The valve would be positioned opposite the direction of tilt.

The piston 18 includes a dome shaped top 22 preferably symmetrical and preferably of a generally conical configuration. Significant variations in the angle of the cone are permissible, however, the preferred angle is about 45°. Variations may be made in order to simplify the exhaust valves. The cylinder head at 34 must conform closely to the configuration of the piston dome. Clearance must be provided and cut outs in the piston may be provided if necessary for clearance of the exhaust valves.

Figure 4:
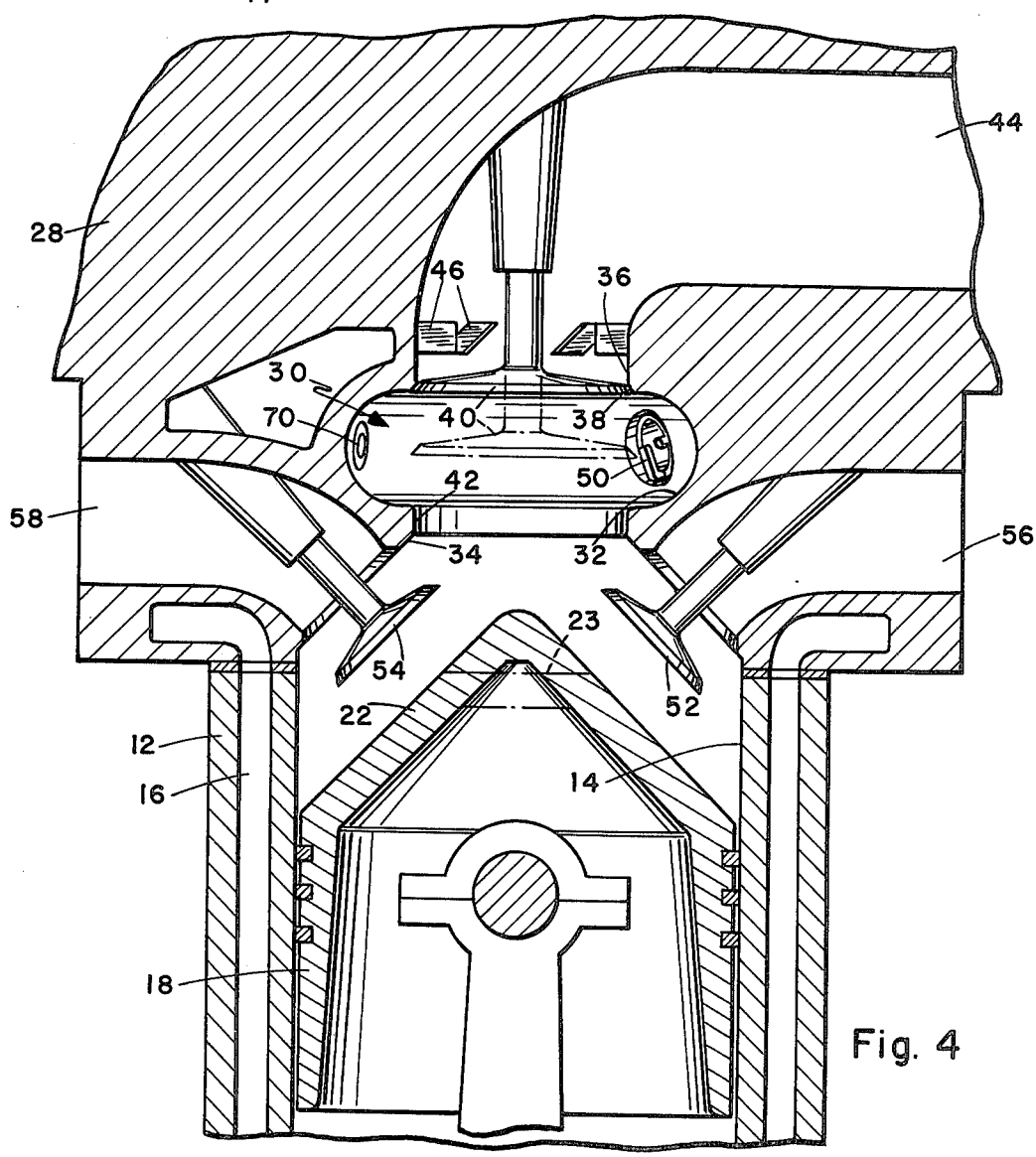
FIG. 4 is a sectional view, similar to FIG. 1, showing the components in the exhaust stroke position.

This piston may have a somewhat truncated cone configuration as shown in broken line at 23 in FIG. 4, for controlling the compression ratio of the engine. In any event, the upper end of top of the cone or piston, must give sufficient clearance to the intake valve 40 to permit opening of the valve significantly prior to top dead center. The engine is designed to operate as a spark ignition internal combustion engine at an optimum compression ratio of about 12 to 1, though more typical current values of 8 to 1 might be used at a price of lower fuel economy. Detonation is controlled by the combustion chamber design as will be explained.

The dimensions of the component are selected for optimum performance. The air inlet passage valve passageway 36 is circular in configuration and of a radius which is approximately one-half the radius of the cylinder. The combustion chamber has a maximum radius of approximately one and one-half times of the radius of the inlet valve or passageway 36. The outlet passageway at 42 of the combustion chamber is approximately equal to the inlet passageway at 36. As in typical practice, the valve 40 opens to a maximum height of ½ its radius. The cross sectional area of the exhaust valve passageways 56 and 58 are approximately 60% of the inlet valve passageway area.

The angle A of the piston dome is selected to be preferably about 45°. An increase in this angle would permit the use of a single exhaust valve and a decrease in this angle would neccessitate the use of two valves. An offset of the combustion chamber by lateral or angular movement of its center line relative to the piston center line would permit the retention of a single exhaust valve at a higher angle of inclination.

The spark plug is located in the combustion chamber so that the spark occurs at about the surface of the combustion chamber at 32 near the outermost diameter of the combustion chamber. An advantage is obtained by use of two spark plugs diametrically opposite. When the spark is of relatively long duration for maximum advantages of ignition, the necessity for two plugs is reduced. Cost considerations will naturally control the exact location and the number of spark plugs. Because air swirl is used to propogate the initial flame, from the spark plug, circumfrentially about the combustion wall, the use of a multiplicity of approximately equal spaced plugs serve to speed up the initial flame spread in direct proportion to the number of plugs used. This is advantageous for maximum power and thermal efficiency. By the same token, for the same speed of initial flame spread, the use of a multiplicity of approximately equal spaced plugs permits a proportionate reduction in required air swirl. Excessive air swirl severly restricts maximum power.

While the conventional carburetor could be used by attachment to the inlet passageway 44, many of the advantages of the current design would be reduced. The present system can operate at higher air to fuel ratios than conventional combustion chambers and hence have low emissions, higher economy and low octane fuel burning capability. Higher compression ratios than conventional combustion chambers can also be used and the advantage obtained by considerably reducing the mixing of exhaust products with the incoming air fuel mixture thereby enhanced.

A preferred arrangement is to use fuel injection either into the air inlet passageway 44 or into the combustion chamber 30. For example, an injector 68 is shown injecting directly into passage 44. The purpose of these types of injectors is to spray a finely atomized spray of liquid fuel droplets into the air entering the combustion chamber. All of these fuel injectors can produce fine fuel droplets by many means familiar to those in the art. By varying the air assist considerably variations in the fuel droplet size can be obtained and ordinary fuel droplet size in the range of approximately 5 microns to 100 microns are readily obtained. A typical fuel spray of good quality might have an average fuel droplet size of approximately 25 microns with a distribution of fuel droplets in a spray from about 5 microns to about 45 microns.

Replacing the conventional carburetor by a fuel injector is preferred on grounds of cost, as one injector only is required and there is a greater choice of alternatives, such as rotating cup injector which does not require air assist or a high fuel pressure as in the case of fuel pressure atomizing fuel injectors. However, it is desirable to use some manifold pre-heat in such a single injector to prevent excessive wetting of fuel on the walls of the air inlet manifold, particularly when using low octane fuels such as kerosene or diesel. Somewhat improved performance at increased cost is obtained by use of multiple air inlet passageway injectors, as illustrated at FIG. 1, or still further gains in performance at further costs can be obtained by the use of combustion chamber injectors.

Alternative combustion chamber injection is shown in FIG. 4, wherein an injector 70 is positioned to inject fuel substantially tangentially with the swirl into and on the walls 32 of the combustion chamber. This better permits the use of a heavier fuel such as kerosene or light diesel fuel to be used. The compression ratio is preferably on the order of 12 to 1 with such fuels.

With the present invention, the air fuel induction stroke occurs as the piston ascends toward top dead center on the exhaust stroke. Because of the large separation of space between the air inlet valve 40 and the exhaust valves 52 and 54, the inlet valve can open unusually early and thus aid maximum power output. This separation also permits the use of a larger inlet valve with an unusually large lift. Thus, a very efficient filling of the cylinder with air fuel mixture can be obtained which more than offsets the reduction in filling obtained when air swirl is used. The reduction of air inlet manifold heating when a single injector is used, or the absence of heating when injectors in the cylinder inlets or cylinders are used, further increases the effectiveness of filling the cylinder with the air fuel mixture, and therefore assures an even higher maximum power output. This unusually effective filling of the cylinders can be traded somewhat for a better part load performance by making the air inlet manifold smaller and/or increasing the air swirl velocity.

As the swirling air fuel mixture is sucked into the combustion chamber by the action of a descending piston, it contains a mixture of partially evaporated fuel in an array of fine fuel droplets varying ordinarily within the range of 5 to 50 microns. The swirling air must make a tight radius turn as it enters and swirls about the combustion chamber. The centrifugal forces on the fuel droplets are greatly increased as compared to the forces on the fuel droplets in the air inlet valve passageway. Under these conditions of high centrifugal force the larger fuel droplets are centrifuged onto the walls of the combustion chamber. A significant deposition of the larger fuel droplets can occur because of the high velocity swirl and the tight radius turn. In passing out of the combustion chamber into the cylinder, the air fuel ratio can be significantly higher than the mean air fuel ratio, as some fuel has been left behind as a fuel film on the walls of the combustion chamber. Passing from the combustion chamber into the cylinder, the swirl flow expands outward to the radius of the piston from the exiting radius of the inlet passage from the combustion chamber. The forces on the smaller droplets of fuel is much reduced, with the result that very little, if any, fuel is centrifuged onto the walls of the cylinder. Because of the conservation of angular momentum, the air swirl is maintained into the cylinder, thus the pressure loss of the air flow is considerably less than would exist in a conventional valve where there is not momentum conservation. This permits a good filling of the cylinder with an air fuel mixture, despite the use of swirling air of unusually high velocities.

The air fuel induction stops with the closure of the air inlet valve 40 at some position after bottom dead center of the piston 18 as it begins to compress the air fuel mixture. Due to the higher swirl velocities than in conventional practive, the air fuel mixture has somewhat more inertia and therefore a later closure of the inlet take valve can be used without detriment to low speed performance. Likewise the shape of the combustion chamber and the location of the exhaust valves permit unusually early opening of the intake valve 40 as to assure high power output while providing good low speed performance.

The swirling air fuel mixture as it flows through the combustion chamber into the cylinder, vigorously sweep the exhaust valves with a cool air fuel mixture and are thus well cooled as compared to conventional engines. Because of the conservation of angular momentum the air fuel swirl is maintained during the compression stroke, thus the whole surface of the cylinder head, the exhaust valves and the walls of combustion chamber are very well cooled by the high velocity swirl of air fuel mixture during a complete revolution of the engine. Such thorough uniform cooling is only possible with a swirl flow and is not possible in conventional engines. The swirling of the air fuel mixture into the cylinder, because of conservation of angular momentum and centrifugal forces acting on the cooler air fuel mixture, results in this mixture being forced outward against the walls of the cylinder as opposed to any exhaust gases left within the cylinder, thus enhancing further the cooling of the engine. Thus, also the mixing of the exhaust products with the fuel air fuel mixture is largely prevented and this greatly enhances fast flame propagation at high air-fuel ratios. The compression of the air fuel mixture reaches a temperature on the order of 700° F., resulting in fine fuel droplets being evaporated and mixed with the air while a layer of gasified liquid fuel remains on the wall of the combustion chamber. Thus, a stratified charge is obtained. A centrifugal force effect on this relatively heavy gaseous fuel will tend to pin it to the walls of the combustion chamber while radially inward lies the hotter exhaust products from the previous cycle of operation.

Figure 2:
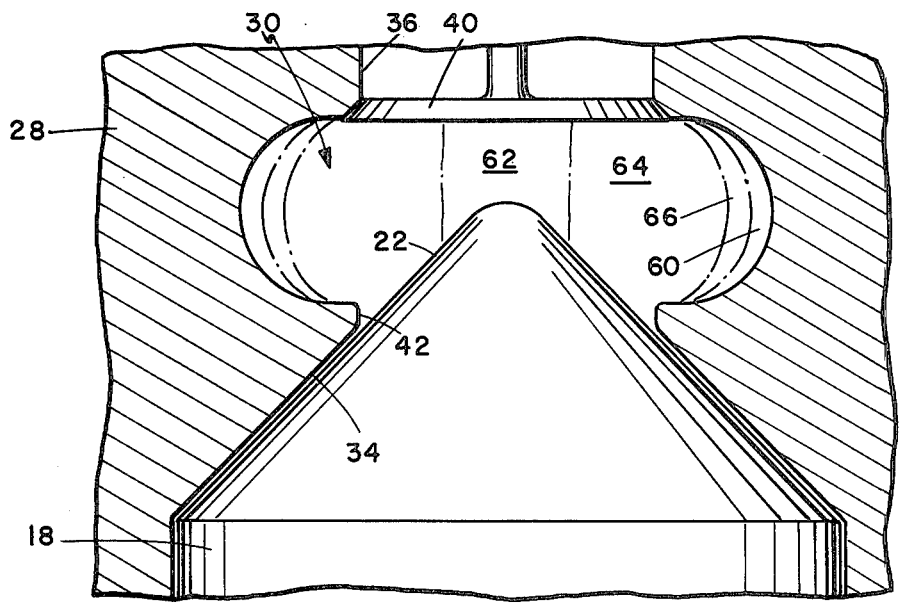
FIG. 2 illustrates the combustion propagation at ignition.

Turning now to FIG. 2 of the drawings, there is illustrated the condition existing at top dead center just after ignition of the fuel air mixture. On the combustion chamber wall at 60 exists a evaporated layer of gasified liquid fuel which is pinned to the wall of the combustion chamber by virtue of the centrifugal forces developed in the swirling gas. At the very center of the combustion chamber is a high temperature portion of exhaust gases of combustion from the previous combustion cycle indicated at 62. Between this combustion gas mixture and the gasified fuel 60 is a bulk air fuel mixture 64 which may be as high as 30 or more. The air fuel ratio will be in a region that is optimum for fast ignition as the air fuel ratio varies from that of the air fuel mixture which might be as high as 30 or more through values down to 16, 12, etc., at or adjacent to the combustion chamber wall 32 where the spark ignition source of the spark plug 50 exists. So long as some fuel exists on the walls of the combustion chamber at 60 a gaseous fuel of an optimum ratio for combustion will exist regardless of the mean air fuel ratio of the total charge in the combustion chamber. Consequently, the use of a prolonged spark and the swirl flow will cause a flame 66 resulting from ignition by the spark plug to quickly envelop the entire chamber at 66.

Figure 3:
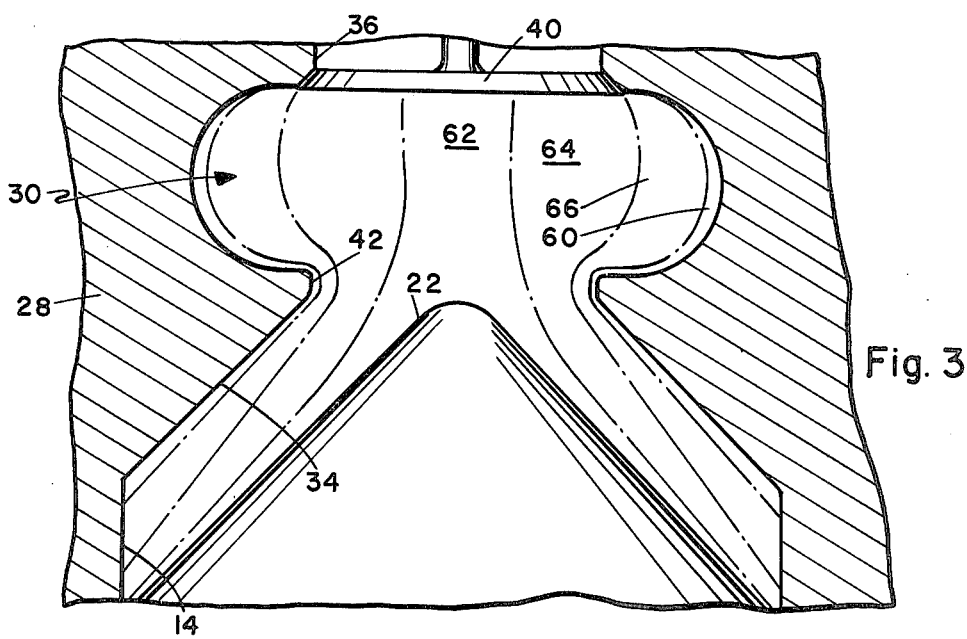
FIG. 3 illustrates the continuing pattern of combustion propagation.

This flame portion 66 will enlarge and travel rapidly inward as shown in FIG. 3, fed from evaporating fuel from the walls at 60. Because flame propagation and ignition is maximized at near stoichiometric conditions and because the swirl is passing fresh unburnt air fuel mixture across the spark, this initial flame portion 66 will quickly form completely encircling the mixture inside the chamber. This becomes a complete symmetric source of additional ignition. The initial envelope of flame 66 is hotter, generally on the order of 3800° F. Very little oxides of nitrogen, generally termed NOX will be formed because the ignition ratio most favored is approximately 14 and this flame has a deficiency of oxygen. Because this flame envelope 66 is much hotter than the inboard air fuel mixture 64, the centrifugal force effects of the swirl will force this flame envelope 66 inward to provide a swift means of ignition igniting the inboard air fuel mixture 64. This inboard air fuel mixture which might in some conditions of operation contain as much as 80% or more of the fuel injected and yet might be at an air fuel ratio of 30 or more, is readily ignited and swiftly burnt because the ignition source is a very hot flame propagated inwards without excessive turbulence that might quench the action. Because the distance the flame must travel is short, on the order of the radius of the combustion chamber, combustion is accomplished quickly and shortly after top dead center, the ideal position. The flame envelope 66 which becomes the ignition source is supplied by additional fuel from the gaseous layer 60 on the combustion chamber wall. In going from a flame temperature of approximately 3800° F. in an oxygen deficient condition to a mean gas temperature oxygen rich of perhaps 3300° F., it would be expected that this flame envelope might create a lot of NOX. This is not the case as the nature of the radial inward flame propagation is such that the random whirls and eddies of normal combustion do not occur and this oxygen deficient flame can mix sufficiently rapidly with the air fuel mixture 64 as to prevent NOX forming reactions. This ability to mix the partly burned fuel with excess air prior to completion of combustion and this ability to propagate a fast flame with high air-fuel ratios are very important considerations of this design.

As the piston begins to descend shortly after the top dead center, as shown in FIG. 3, part of the air fuel mixture 64 has begun to burn. The unburnt air fuel mixture 64 and the exhaust products 62 escape out of the combustion chamber forcing the piston down. The centrifugal forces are reducing during the expansion from the radius of the outlet of the combustion chamber to the radius of the cylinder and thus the rate of propagation inwards of the ignition envelope is reduced. The variation in the rate of flame propagation in conjunction with a spark timing provides a precise means of optimizing the combustion to maximum effect. A more complete combustion of all the minor traces of carbon monoxide and hydrocarbons is obtained by the fact that the exhaust gases from the previous combustion cycle have not greatly mixed with the air fuel mixture.

Different modes of engine operation require different proportions of air fuel mixture. Full power operation where maximum amount of fuel is required is best done by insuring a large amount of fuel is placed on the walls of the combustion chamber so that the last part of air to be burned is not excesively high in fuel and hence prone to detonation. This is particularly critical at low engine speed with full throttle. This can be controlled by programming the droplet size in proportion to the speed required by controlling the injection process.

While the present invention and combustion chamber is primarily designed for optimum operation with gasoline engines, it has numerous advantages when used in a diesel or heavier fuel engine at higher compression ratios of the order or 16 or more. For example, high pressure injection of the fuel deliberately sprayed directly on the combustion chamber walls just prior top dead center would result in ignition of the fuel air interface almost immediately after the top dead center, so that the bulk of the fuel would not burn until the centrifugal forces have been reduced as the piston starts to descend and hence combustion would occur as determined by piston motion immediately after top dead center. The circumferentially uniform fuel distribution is readily obtained with a simple single orifice injector 70 directly into the combustion chamber as opposed to the typical more complex multi-orifice injection injectors currently used. Another advantage of the present combustion chamber is the elimination of the critical injection timing required for injection into the typical piston located combustion chambers. Thus circumferentially uniform distribution in conjunction with the circumferentially uniform air turbulence, which again is not found in the universally employed piston combustion chambers, permits much more effective fuel utilization and hence high power and less smoke. The centrifugal propagation of the fuel inwards also reduces the NOX.

The same principals could be used with high pressure fuel injection gasoline engines, although it is not apparent that there would be many advantages. The fuel would be sprayed onto the walls are with a diesel, through injection could start sooner and ignition would be obtained by a spark. This application would be useful in dual fuel military engines. Another major advantage of the present invention is that the fuel timing is not critical and the fuel could be sprayed onto the walls of the combustion chamber over a wide range of different positions in the induction stroke. The fuel could, for example, be sprayed onto the combustion chamber at the end of the induction stroke when the piston is at the bottom dead center. This of course, would not be possible with piston located combustion chambers. Since the air pressure would be sub-atmospheric or very low pressure in a case of super charged engines this will remove one of the problems of diesels, for example, the need for very high pressure fuel injection. The same principles would of course apply to gasoline engines with fuel injection.

While the present invention is illustrated and described by means of specific embodiments, it is to be understood that numerous changes and modifications may be made therein without departing from the spirit and scope of the invention as defined in the appended claims. For example, the invention is applicable to either spark ignition or compression ignition engines, to air cooled or water cooled, and to single cylinder and multi-cylinder engines.

Having described my invention, I now claim:

1. In an internal combustion engine of the spark ignition type having at least an intake stroke and a power stroke, a cylinder, a cylinder head closing one end of the cylinder, and a piston reciprocally mounted in said cylinder, the improvement comprising:
   an open toroidal combustion chamber formed in the cylinder head and in full open communication with one end of said cylinder and through which the entire charge of combustion air flows into the cylinder,
   an inlet port in one end of said combustion chamber in communication with an intake passage for communicating combustion air into said chamber,
   inlet value means in said inlet port for controlling the flow of combustion air into said chamber and through said chamber into said cylinder.
   an outlet port in the other end of said chamber opening into said cylinder for communicating combustion air hereto, said inlet and outlet ports having substantially the same diameter, and said chamber having a greater diameter than said inlet and outlet ports
   means for swirling combustion air flowing into said combustion chamber for centrifugally depositing fuel depositing fuel droplets on the walls of the combustion chamber, for thereby establishing a high fuel to air combustion mixture closely adjacent the walls of the combustion chamber, and
   spark ignition means disposed in said combustion chamber closely adjacent the walls of the combustion chamber for igniting said high fuel to air combustion mixture.

2. The internal combustion engine of claim 1, wherein said combustion chamber is disposed substantially coaxially of said cylinder.

3. The internal combustion engine according to claim 1, wherein said combustion chamber is symmetrical about a substantially vertical axis.

4. The internal combustion engine according to claim 3, wherein said combustion chamber is coaxially disposed with said cylinder.

5. The internal combustion engine according to claim 1, wherein said piston is dome shaped and a portion thereof protrudes into said combustion chamber at top dead center.

6. The internal combustion engine in acordance with claim 5, wherein said piston is of a substantially conical configuration at the top thereof,
   and said cylinder head is shaped to define a substantially truncated cone between said combustion chamber and said cylinder.

7. The internal combustion engine according to claim 6, wherein said engine includes an exhaust valve communicating with said cylinder and disposed between said combustion chamber and said cylinder in said truncated cone portion of the cylinder head.

8. The internal combustion engine of claim 7, wherein said engine includes a pair of diametrically opposed exhaust valves, the angle of said truncated cone is approximately 45°.

9. The internal combustion engine according to claim 1, wherein the inlet and outlet to said combustion chamber are coaxially disposed with respect thereto and are substantially the same diameter, said combustion chamber diameter is approximately 1 and ½ times the diameter of the inlet and outlet passageways.

10. The internal combustion engine according to claim 9 including a spark plug mounted in said cylinder head with the spark inducing portion thereof disposed to provide a spark substantially at the surface of the combustion chamber substantially at the outermost diameter thereof.

11. The internal combustion engine of claim 10, including a plurality of spark plugs equally diametrically spaced in said cylinder head communicating with said combustion chamber.

12. The internal combustion engine of claim 1, including injector means for injecting fuel droplets into said inlet.

13. The internal combustion engine according to claim 12 wherein said injector means is timed to inject said fuel droplets only when the inlet valve means is open.

14. The internal combustion engine of claim 1, including injector means for injecting fuel into said combustion chamber.

15. The internal combustion engine according to claim 14 wherein said injector means is timed to inject said fuel droplets only when the inlet valve means is open.

16. The internal combustion engine in accordance with claim 1, wherein said inlet includes an intake valve timed to open substantially in advance of top dead center of the piston on the exhaust stroke.

* * * * *